3,255,031
METHOD OF MAKING ROOFING GRANULES AND PRODUCT THEREOF
James R. Lodge and Robert H. Fehner, St. Paul, Minn., assignors to Minnesota Mining and Manufacturing Company, St. Paul, Minn., a corporation of Delaware
No Drawing. Filed July 30, 1962, Ser. No. 213,101
8 Claims. (Cl. 117—27)

The present invention relates to artificially color coated mineral roofing granules wherein the color coatings are formed from pigmented alkali silicate compositions, and in which there is a highly desirable balance of properties, including high stain resistance, high color level with efficient pigment utilization, and high insolubility of the color coating (as reflected by low alkalinity).

In the roofing granule industry, the use of soluble alkali metal silicates, such as sodium silicate, as a binder in forming an insoluble pigmented coating composition, has become rather general. In the instance of granules which are fired at relatively high temperatures to insolubilize the pigmented silicate coating composition, heat reactive clays, such as kaolin, are customarily used to insure proper insolubilization of the coating composition. In this respect, see Jewett et al. Patent No. 2,379,358, granted June 26, 1945. Color benefits also are derived from the use of the clay, particularly in the instance of white, or light colored granules, such that equivalent color levels (reflectances) are attained utilizing lesser amounts of pigment in the coating composition than where no clay is employed. In the instance of granules fired at low temperatures, in the order of 350° F. to 400° F., the clays ordinarily are not employed, and in order to neutralize and insolubilize the coating composition, a subsequent acid or acid salt pickling step is usually employed. In place of the pickling step, acidic materials, such as aluminum fluoride, sodium fluosilicate, etc., can be added to the coating composition.

Each of the so-called low temperature and high temperature types of process has found its place in the commercial manufacture of roofing granules. In each type there are known advantages and known disadvantages.

For example, in low temperature granules resistance to staining by oils and other migratory materials in asphalt roofing in which the granules are embedded, is high, and blistering of the roofing due to granules is at a minimum. Low temperature processes also economize on fuel and permit the use of certain pigments which are heat-sensitive, such as phthalocyanine green, and which burn out or lose color at very high temperatures. On the other hand, the low temperature processes ordinarily are not too suitable economically for producing light colored, or white, granules. The high temperature granule processes, while finding wide use for light colored or white granules, do not exhibit particularly high stain resistance, unless some further additive or special processing, or treatment, is employed. In this respect, see copending Langseth and Lodge application Serial No. 213,126, now Patent No. 3,208,871, filed concurrently herewith, which discloses high temperature granules having high stain resistance.

Where granules having a pigmented clay-silicate coating composition are fired at low or intermediate temperatures without chemical neutralization, stain resistance is improved over that attained with high temperature firing. This apparently is due at least in large part to the fact that the porosity of coatings is less where firing is at lower temperatures than where firing is at high temperatures. However, other problems arise with the lowered firing temperature. Adhesion of the granules in bituminous roofing is difficult to attain, and there is a marked tendency to blooming. Both of these problems apparently are related to the incomplete reaction (and incomplete insolubilization) of the sodium silicate and clay, with resulting excessive alkalinity in the granule coating.

The foregoing has been well known for many years, as is evidenced from the various prior art patents concerned, in one way or another, with provision of effective permanent color coating compositions for roofing granules. See, for example, Jewett Patent No. 2,379,358 aforesaid, and Buzzell et al. Patent No. 2,614,051 granted October 14, 1952. It is apparent that a need has long existed for a color coated granule in which the advantages attained from low temperature firing (e.g. stain and blistering resistance and low porosity) are combined with advantages attained from high temperature firing, such as low solubility, and efficient use of pigments and reactive clays. Insofar as we are aware, however, no one heretofore has provided a granule having a clay-silicate coating composition which can be fired at temperatures below about 850° F., or a silicate coating composition of any kind which, when fired at temperatures below about 850° F., does not require the use of subsequent pickling steps, acidic additives, or the like, to insolubilize the coating. The accomplishment of this end is a primary objective of our invention.

In accomplishing this, and attaining other advantages of our invention, we employ a small amount of borate, such as sodium tetraborate decahydrate, more commonly known as "borax," in the pigmented silicate coating composition, and fire the granules coated therewith at temperatures preferably in the order of about 600° F. to about 700° F., but have found advantages result with temperatures up to about 950° F., or higher. Coating compositions comprised of alkali metal silicate, reactive clays, and a small amount of borate, are especially preferred in yielding granules having nicely balanced properties of relatively low porosity (and attendant relatively high stain and blister resistance), high color level and efficient pigment utilization, and low solubility. Indeed, in the instance of light colored granules, we have found that a lightening or whitening effect results from the use of pigmented clay-silicate-borate coating compositions, which is attributable neither to the pigment itself nor to the pigment extending effect of reactive clays. In short, we have noticed that color benefits are derived from the use of the borate, although we know of no reason why this should be so.

The alkalinity of the granules hereof fired at around 650° F. is low, and insolubilization of the coatings appears to be substantially complete. Adhesion of the granules in roofing is easily attained with the usual adhesion treatments, and there is little or no tendency toward staining and blooming. We find it surprising that basic materials such as borate salts effect insolubilization of the likewise basic silicates.

Our invention will now be illustrated with the aid of the following examples wherein parts are expressed by weight, unless otherwise indicated:

*Example 1*

The coating composition is prepared in accordance with the following formulation:

Constituents: Pounds
$TiO_2$ ------------------------------------ 10
Kaolin clay -------------------------------- 20
"K" brand aqueous sodium silicate (42.9% solids) ($Na_2O:SiO_2$ ratio equals 1:2.9) -------- 45
Sodium tetraborate decahydrate (borax) ----- 4
Water -------------------------------------- 15

The ingredients of the coating composition are first mixed together, following which the composition is applied to 2,000 pounds of No. 11 grade (minus 10, plus 35 mesh) mineral granules, for example, greystone granules, in a tumbling barrel-type mixer. The coating is then pre-dried, by passing air through the mixer, until the coated granules are free flowing, all in accordance with conventional practice, after which the granules are transferred to a rotary kiln and fired at 700° F., dwell time in the kiln being about 15–20 minutes. The granules are then cooled in a rotary cooler. The resulting granules have a pleasing silver grey color.

These granules, when compared to similar granules fired to 700° F., but made without borax in the formula evidenced substantially greater reaction and greater insolubility of the color coating. Alkalinity of the granules of the present example was only 50% of that of the borax-free granules, and loss of coating in a 6-hour boil test was appreciably less, indicating superior bond strength in the former. The granules of this example were desirably lighter in color and had improved adhesion to asphalt.

Granules made in accordance with this example are comparable in color to conventional silver gray granules having a clay-silicate coating composition fired at high temperatures, in the order of 950° F., and are markedly improved in tendency to blister and in resistance to staining by the oils and other migratory materials in asphalt roofing. The adhesion of granules in asphalt roofing in certain cases seems to be at least somewhat, but significantly, improved, also.

*Example II*

A precoat composition is prepared in accordance with the following formulation:

Constituents: Pounds
$TiO_2$ _____ 15
Kaolin _____ 50
"K" brand aqueous sodium silicate (42.9% solids) ($Na_2O:SiO_2$ ratio equals 1:2.9) _____ 62
Water _____ 24

The ingredients of the coating composition are first mixed together, following which the composition is applied to 2,000 pounds of #11 grade mineral granules, for example greystone granules, in a tumbling barrel-type mixer. The coating is then pre-dried, by passing air through the mixer, until the coated granules are free-flowing, all in accordance with conventional practice, after which the granules are transferred to a rotary kiln and fired at 950° F., dwell time in the kiln being about 20 minutes. The granules are then cooled in a rotary cooler.

A second coating composition is prepared by mixing ingredients in accordance with the following formulation:

Constituents: Pounds
$TiO_2$ _____ 15
Kaolin (Dover clay) _____ 10
Sodium tetraborate decahydrate (borax) _____ 4
"K" brand aqueous sodium silicate (42.9% solids) _____ 45
Water _____ 25

The second coating composition is applied to the cooled precoated granules as in Example I, following which the granules are fired in a rotary kiln at 700° F. to insolubilize the coating. Granules are again cooled and suitable oil or treatments are applied as desired.

This example describes a highly stain resistant white granule which is fired at intermediate temperatures, wherein the stain resistance characteristics meet even the most stringent present day requirements. The porosity of the precoat composition is substantially higher than the porosity of the second coat composition where the latter is coated alone on mineral granules and insolubilized, as will be apparent when the two are subjected to conventional oil absorption tests.

The provision of stain resistant artificially color-coated granules by applying multiple coatings thereto wherein the porosity of the overcoating is substantially less than that of the precoating, is the subject, generally, of Langseth and Lodge application Serial No. 213,126, now Patent No. 3,208,871, filed concurrently herewith, and referred to hereinabove.

*Example III*

The coating composition is prepared in accordance with the following formulation:

Constituents: Pounds
Red iron oxide pigment _____ 10
Kaolin (Dover clay) _____ 20
"K" brand aqueous sodium silicate (42.9% solids) ($Na_2O:SiO_2$ ratio equals 1:2.9) _____ 45
Sodium metaborate _____ 4
Water _____ 25

The coating composition is prepared and the granules are coated and fired at a temperature of about 650° F., similarly as in Example I above.

The resulting red granules are fully comparable, commercially speaking, to similarly colored red pigmented clay-silicate coated granules fired at much higher temperatures (as is presently conventional) and have superior resistance to staining and blistering on the asphalt roofing in which the granules are embedded. Brightness in color exceeds that in otherwise identical color coating compositions, but containing no borate, fired at 950° F. Other colored pigments than the red iron oxide can be employed, including some, such as phthalocyanine green, which are sufficiently stable at the firing temperature of this example, but not at 950° F.

While the preceding examples have illustrated some of the oxygen-containing boron compounds which are useful in our invention, various other such boron compounds are also effective. For example, various hydrates of sodium tetraborate can be employed in place of borax, with generally equivalent results, as can aluminum borates, lithium borates, lead borates, magnesium borates, and zinc borates. By and large, the borates employed should be compatible with a solution of sodium silicate so as not to gel the sodium silicate. Gelling, as is known, tends to weaken the resulting bond of the color coating. Some borates, such as $Na_2B_8O_{13} \cdot 4H_2O$ (commercially available as "Polybor") apparently have such a high ratio of boron to sodium so as to cause the sodium silicate solution to be unstable. Boric acid likewise is unsatisfactory.

The boron need be present only in small, but significant, amounts. Preferably the amount of the borate employed does not exceed about six pounds per ton (2,000 lbs.) of base granules, and we prefer that at least two pounds be present; although satisfactory results are obtained with lesser amounts. Preferably around four pounds of borate per ton of granules are employed.

The coating compositions disclosed herein have been found to be useful for color coating surfaces other than roofing granules. For example, they have been used to coat sheet aluminum, steel, ceramic bodies, asbestos cement articles, etc.

What we claim is as follows:

1. A process for preparing artificially color-coated granules comprising coating raw mineral granules with an aqueous pigmented alkali silicate composition containing therein a clay that is heat reactive with the alkali silicate and an oxygen containing boron compound that is substantially non-gelling with the alkali silicate for secure bonding of the composition to the raw mineral granules, and insolubilizing said coating by firing said coated granules to a temperature below about 950° F.

2. Process for preparing artificially color-coated granules, said process comprising coating raw mineral granules with an aqueous coating composition comprising soluble alkali silicate, a clay that is heat reactive with the alkali silicate, and a sodium borate, said borate being present in an amount up to about six parts per 2,000 parts of base granule; firing the coated granules at a temperature of from about 600° F.–850° F. to insolubilize the coating.

3. A color coated granule comprising a base mineral granule having firmly bonded thereto an unglazed pigmented coating composition comprising the insolubilized reaction product of soluble alkali silicate, clay that is heat reactive with the alkali silicate, and metal borate that is substantially non-gelling with the alkali silicate for secure bonding of the composition to the base mineral granule.

4. A color coating composition suitable for preparing insolubilized and unglazed artificially color-coated granules comprising in dilute aqueous suspension a mixture including substantial portions of soluble alkali silicate, clay that is heat reactive with the alkali silicate, and pigment, and an oxygen-containing boron compound of an amount whereby the boron therein is about one percent by weight of the alkali silicate, said boron compound and said silicate being compatible without gelling of the latter.

5. A composite sheet body for roofing and siding, comprising a bituminous sheet material having a firmly adherent surfacing consisting essentially of color coated granules as defined in claim 3.

6. A color-coated granule comprising a base mineral granule having firmly bonded thereto an unglazed pigmented coating composition comprising the insolubilized reaction product of soluble alkali silicate, a clay that is heat reactive with the alkali silicate, and an oxygen-containing boron compound that is compatible with the alkali silicate without gelling thereof, said reaction product being produced within a temperature range of less than about 900° F.

7. A composite material including a metal substrate having firmly bonded thereto an unglazed pigmented coating composition comprising the insolubilized reaction product of soluble alkali silicate, clay that is heat reactive with the alkali silicate and metal borate.

8. A color-coated granule comprising a base mineral granule having firmly bonded thereto an unglazed pigmented coating composition comprising the insolubilized reaction product of soluble alkali silicate, kaolin clay, and an oxygen-containing boron compound that is substantially non-gelling with the alkali silicate for secure bonding of the composition to the base mineral granule.

References Cited by the Examiner

UNITED STATES PATENTS

| 1,944,800 | 1/1934 | Nichols | 117—100 |
| 2,081,609 | 5/1937 | Tietor | 117—27 |
| 2,163,678 | 6/1939 | Gunlach | 117—100 |
| 2,298,277 | 10/1942 | Burton | 117—100 |
| 2,331,358 | 10/1943 | Swenson | 117—27 X |
| 2,553,604 | 5/1951 | Pole | 117—27 |
| 2,927,045 | 3/1960 | Lodge et al. | 117—100 |

RICHARD D. NEVIUS, *Primary Examiner.*

R. E. ZIMMERMAN, A. H. ROSENSTEIN,
*Assistant Examiners.*